US012618974B2

(12) United States Patent
Brueck et al.

(10) Patent No.: US 12,618,974 B2
(45) Date of Patent: May 5, 2026

(54) INTEGRATED BOUND-MODE ANGULAR SENSORS

(71) Applicant: UNM RAINFOREST INNOVATIONS, Albuquerque, NM (US)

(72) Inventors: Steven R.J. Brueck, Albuquerque, NM (US); Payman Zarkesh-Ha, Albuquerque, NM (US); Alexander Neumann, Albuquerque, NM (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 1269 days.

(21) Appl. No.: 17/439,291

(22) PCT Filed: Mar. 14, 2020

(86) PCT No.: PCT/US2020/022855
§ 371 (c)(1),
(2) Date: Sep. 14, 2021

(87) PCT Pub. No.: WO2020/190816
PCT Pub. Date: Sep. 24, 2020

(65) Prior Publication Data
US 2022/0155444 A1 May 19, 2022

Related U.S. Application Data

(60) Provisional application No. 62/818,965, filed on Mar. 15, 2019.

(51) Int. Cl.
*G01S 17/42* (2006.01)
*F21V 8/00* (2006.01)
(Continued)

(52) U.S. Cl.
CPC ............ *G01S 17/42* (2013.01); *G01S 7/4814* (2013.01); *G01S 7/4816* (2013.01);
(Continued)

(58) Field of Classification Search
CPC .... G01S 7/4865; G01S 7/4814; G01S 7/4816; G01S 17/42; G01S 17/931
See application file for complete search history.

(56) References Cited

U.S. PATENT DOCUMENTS

| | | | | |
|---|---|---|---|---|
| 2011/0318016 A1* | 12/2011 | Wyss | ................. | H04B 10/2589 398/141 |
| 2013/0285253 A1* | 10/2013 | Aoki | ....................... | H01L 24/11 438/455 |

(Continued)

FOREIGN PATENT DOCUMENTS

| | | |
|---|---|---|
| CN | 105428998 A | 3/2016 |
| EP | 0326203 A1 | 8/1989 |
| EP | 3270128 A1 | 1/2018 |

OTHER PUBLICATIONS

Wikipedia entry on Time-of-flight cameras as captured by Wayback Machine on Mar. 3, 2019 (Year: 2019).*
(Continued)

*Primary Examiner* — Thomas A Hollweg
*Assistant Examiner* — Kirsten D. Endresen
(74) *Attorney, Agent, or Firm* — MH2 Technology Law Group LLP

(57) ABSTRACT

An angular sensitive time-of-flight position sensor device is provided and includes an array of pixels each comprising: a planar waveguide structure; a collection area with a grating pattern at a specific periodicity to couple incident light into the planar waveguide structure; at least one detector placed outside of the collection area and in a plane different from that of the planar waveguide structure; an output coupler to direct the light from planar waveguide to the at least one
(Continued)

detector; a mask to shield the at least one detector from direct illumination; a narrow band light source that illuminates a field-of-view; a first electronics configured to detect the time-of-flight of light retroreflected, scattered, or both incident onto the position sensor and configured to provide distance ranging information; and a second electronics configured to interpret and retain time-of-flight information and configured to communicate with external electronics for system applications.

12 Claims, 17 Drawing Sheets

(51) Int. Cl.

| | |
|---|---|
| *G01S 7/481* | (2006.01) |
| *G01S 7/4865* | (2020.01) |
| *G01S 17/931* | (2020.01) |
| *G02B 6/42* | (2006.01) |

(52) U.S. Cl.
CPC .......... *G01S 7/4865* (2013.01); *G01S 17/931* (2020.01); *G02B 6/0038* (2013.01); *G02B 6/42* (2013.01); *G02B 6/4206* (2013.01)

(56) References Cited

U.S. PATENT DOCUMENTS

| | | | |
|---|---|---|---|
| 2014/0103018 | A1 | 4/2014 | Squier et al. |
| 2016/0282441 | A1 | 9/2016 | Laine et al. |
| 2016/0335778 | A1 | 11/2016 | Smits |
| 2017/0195532 | A1* | 7/2017 | Kuo .................. G02B 6/29335 |
| 2018/0024001 | A1* | 1/2018 | Brueck ................ H10F 39/107 |
| | | | 250/208.2 |

OTHER PUBLICATIONS

Search Report dated Aug. 27, 2020 in corresponding International Application No. PCT/US2020/022855, 3 pages.
Written Opinion dated Aug. 20, 2020 in corresponding International Application No. PCT/US2020/022855, 5 pages.

* cited by examiner

450 µm

450 µm

450 µm

Pairs of collection areas; detectors in parallel collection area: 10- to 20- µm x 450 µm Collection Detection Sweep illumination in vertical direction Resolution in horizontal plane provided by angular sensor TOF array Line thickness indicates specific detector (See Fig. 5).
Solid curves forward scattering
Dashed curves backward scattering

INTEGRATED BOUND-MODE ANGULAR SENSORS

CROSS REFERENCE TO RELATED APPLICATIONS

This application is a U.S. National Phase application of PCT/US2020/022855 filed Mar. 14, 2020, which claims priority to U.S. provisional application Ser. No. 62/818,965 filed Mar. 15, 2019, the entireties of which are incorporated herein by reference.

GOVERNMENT SUPPORT STATEMENT

This invention was made with government support under Grant No. EEC0812056 awarded by the National Science Foundation and under Grant DE-AR0000942 awarded by ARPA-E. The government has certain rights to the invention.

FIELD OF THE INVENTION

This invention is related to the field of angularly resolved optical detection, specifically to the use of multiplexed angularly sensitive bound-mode sensor arrays.

BACKGROUND OF THE INVENTION

Many emerging sensing applications require information on of the directionality of light incident from free space onto a detector. Examples include: lidar for autonomous platforms such as self-driving cars where obstacle detection and avoidance are a critical safety need; people counting in enclosed spaces for building HVAC control and energy conservation; activity sensing in indoor spaces without the use of cameras for privacy preservation, these spaces could include hospitals and nursing homes, schools, private homes, etc. These sensors could detect conditions, such as falls, and provide alerts for emergency response. The increasing senior citizen demographic is leading to increased need for such services.

One approach to these needs is the use of time-of-flight (TOF) sensors, which rely on reflection and scattering of an optical signal and measurement of the time duration from the initiation of the pulse to the detection, to provide a distance measurement. Commercially available TOF sensors are single channel, including a source and a single detection element. Thus, these TOF sensors are not suitable for applications that require input from multiple directions or covering a large field of view. In particular, the lidar application requires sensing objects in multiple directions to avoid collisions, the people counting requires a high angular field of view to reduce the density of sensors that would be required for single direction sensors. The monitoring of spaces requires a low-resolution sensing, for example to see if someone has fallen, without the privacy concerns associated with imaging solutions such as cameras, but at the same time requires a wide field of view to assure coverage of, for example, a large meeting room.

Some current solutions to the autonomous vehicle lidar problem include actively rotating frameworks which have issues with both size and reliability. An integrated solution would resolve many of the concerns. The cost and installation logistics of a large network of fixed angle sensors for indoor spaces would be prohibitive, a multi-angle sensor would be a much more efficient solution.

An integrated solution requires a) a transmitter at a fixed wavelength ($\lambda_0$) irradiating a wide angular cone with pulses with sufficient rise time to allow resolution commensurate with the application; b) retroreflections from objects within the irradiated space back to a detection array; c) coupling of the free space retroreflections (approximating plane waves at sufficient distances) to a semiconductor detector array retaining the incident angular information; and d) time-of-flight electronics. Grating coupling to a bound waveguide mode provides a mechanism that retains the angular information. The grating equation that describes the phase matching condition required for coupling from free space propagation to a bound waveguide mode for a geometry in which the incident angle is in the plane defined by the grating wavevector (normal to the grating lines) and the waveguide surface normal is given by:

$$\frac{2\pi \sin \theta_{in}}{\lambda_0} + j\frac{2\pi}{d_i} = \pm \frac{2\pi}{\lambda_0} n_{mode}^{TE,TM}(\lambda_0) \tag{1}$$

where $\theta_{in}$ is the angle of incidence ($-1 < \sin \theta_{in} < 1$), j is an integer ($\pm 1, \pm 2, \ldots$), $\lambda_0$ is the optical wavelength, $d_i$ is the period of the i'th grating in the array; and $$n_{mode}^{TE,TM}(\lambda_0)$$

is the modal wave vector (different for TE and TM polarization) typically given by a dispersion relation that takes into account the waveguide structure and the incident wavelength. The extension of this result to all angles of incidence (known as conical diffraction) will be discussed below.

The bound mode can be either a surface plasma wave at a metal-dielectric interface, bound to the surface as a result of the negative dielectric constant of the metal, or a dielectric waveguide mode formed by a cladding-waveguide-cladding stack. In either case, the modal index $$n_{mode}^{TE,TM}(\lambda_0)$$

is greater than the index of free space ($n_{free\_space}=1$). A major advantage of a dielectric stack bound waveguide mode is that it is close to lossless (assuming low-loss dielectric materials such as $SiO_2$ and $Si_3N_4$ or others). The only losses arise from fabrication imperfections (scattering sites/surface roughness) and from the re-radiation into free space associated, by detailed balance, with the coupling grating. In contrast metal dielectric properties in general exhibit significant loss across the visible and near-infrared, restricting the angular or wavelength resolution. Further, as a result of the high metal loss propagation lengths for surface plasma waves in the visible are likely too short to allow flexibility in the device design.

While there have been many demonstrations of far-field filtering (plane wave to plane wave), relatively few demonstrations of integrated coupling (plane wave to plasmonic mode) to semiconductor materials for detection have been presented. In these few demonstrations, linewidths have been broad, typically 100 to 200 nm. The term "plasmonics" generally covers both extended (propagating) surface plasma waves (SPW) defined on a metal-dielectric interface and localized surface plasma resonances (SPR) associated with metal particles, holes in a metal film, discs of metal, etc. The angular responses SPW's and SPR's are quite different with SPW's having a narrow angular response depending on the periodicity of the surface while SPR's have generally angularly-independent responses. In any physical plasmonic structure these two resonances coexist giving a complex, wavelength dependent angular response. Meanwhile, pixels are generally small, driven by trends in high-pixel count cameras where individual pixels are sub-10 microns. Further, many studies have demonstrated a far-field filter approach based on extraordinary optical transmission through arrays of holes in a metal film where the far-field transmission of the filter is used as the spectrally selective quantity. That approach is difficult to achieve in a convenient form factor as a result of the long propagation distances required to achieve a far field regime, requiring standoff of the filter element from the silicon detector array.

Other work has focused on radiation coupling with a planar waveguide fabricated on a substrate. For example, guided-mode resonance (GMR) filters, consisting of a grating coupler and a single mode slab waveguide on a transparent substrate have demonstrated both angular and spectral sensitivity in reflection and transmission. Off-resonance, GMR filters simply act as a dielectric medium, usually with the majority of the incident power simply being transmitted. On resonance, the grating couples some of incident photons into the waveguide and the propagating photons in the waveguide are coupled back into the reflected and transmitted beams. As a result of the phase shifts inherent in this process, the out-coupled photons reinforce the reflected wave and interfere destructively with the directly transmitted light to reduce the transmitted power. Since the waveguide is lossless and the grating is large (many wavelengths), an extremely narrow resonance response is achieved.

Waveguide integrated optics at telecommunications wavelengths has demonstrated that grating coupling into waveguide modes can provide the necessary spectral and angular filtering with recent demonstrations of only 0.6 dB loss in conversion from a 2D waveguide to a single mode fiber.

What is needed is a device that comprises pixels with both color and angular sensitivity that can be integrated onto a silicon surface with a scalable, manufacturable process (e.g., not requiring separate fabrication steps for each desired wavelength/angle setting), providing both manufacturing convenience and reduced form factors.

SUMMARY

According to examples of the present disclosure, an angular sensitive time-of-flight position sensor device is provided and comprises an array of pixels each comprising: a planar waveguide structure; a collection area with a grating pattern at a specific periodicity to couple incident light into the planar waveguide structure; at least one detector placed outside of the collection area and in a plane different from that of the planar waveguide structure; an output coupler to direct the light from planar waveguide to the at least one detector; a mask to shield the at least one detector from direct illumination; a narrow band light source with a bandwidth less than an acceptance bandwidth of the grating pattern on the planar waveguide structure ($\Delta\lambda << \Delta\theta d \cos(\theta)$ with $\Delta\theta$ the angular resolution and d the period of the coupling grating) that illuminates a field-of-view; a first electronics configured to detect the time-of-flight of light retroreflected, scattered, or both incident onto the position sensor and configured to provide distance ranging information; and a second electronics configured to interpret and retain time-of-flight information and configured to communicate with external electronics for system applications.

Various additional features of the angular sensitives time-of-flight position sensor device can include one or more the following. The output coupler is a second grating and the at least one detector is incorporated in the plane of a substrate. The output coupling is configured by arranging the at least one detector in a region of evanescent fields of a waveguide mode in a cladding of the planar waveguide structure. The grating pattern is a 2D pattern. The 2D grating pattern has substantially the same periodicity in two orthogonal directions. The 2D grating pattern has different periodicities in two orthogonal directions. The planar waveguide structure is removed in at least a portion of regions between pixels to reduce crosstalk between adjacent pixels. The sensor device can include an absorbing material that is added in regions where the planar waveguide structure is removed to reduce coupling of scattered light between pixels. Gratings in the collection area and gratings over the at least one detector area have different coupling constants to allow use of a detector area smaller than the collection area. The sensor device can further include a silicon wafer configured to provide both mechanical support for the planar waveguide structure and the electronics that provide the time-of-flight information. The planar waveguide structure and the electronics are fabricated on two substrates and bonded together along with thru-silicon-vias for electrical connection.

According to examples of the present disclosure, an angular sensitive time-of-flight position sensor device is provided and includes an illumination source configured to be scanned in one direction; a 1D angular sensitive array comprising: a planar waveguide structure; a multiplicity of collection areas with grating patterns at specific periodicities to couple incident light into the planar waveguide structure; at least one detector placed outside of the collection area and in a plane different from that of the planar waveguide structure; an output coupler to direct the incident light from planar waveguide structure to the at least one detector; a mask configured to shield the at least one detector from direct illumination; electronics that detects a time-of-flight retroreflected light incident onto the position sensor and provides distance ranging information; and electronics for interpretation and retention of time-of-flight information and for communication with external electronics for system applications.

Various additional feature of the angular sensitive time-of-flight position sensor device can include one or more of the following features. The output coupler is a second grating and the at least one detector is incorporated in a plane of a substrate. The output coupling is configured by arranging the at least one detector in a region of evanescent fields in a cladding of the planar waveguide structure.

According to examples of the present disclosure, a laser source is provided and comprises an illumination source characterized by a wavelength and a bandwidth; a planar waveguide structure comprising at least a first cladding, a core and a second cladding layer, characterized by at least a modal index of refraction, optically coupled to a portion of output light of the illumination source; an emission area with a grating pattern to couple a portion of output power of the illumination source out of the planar waveguide structure, wherein a direction of outcoupled radiation is determined by the wavelength of the illumination source, a period of the grating pattern, and one of the at least one of the modal indices of the planar waveguide structure.

Various additional feature of the laser source can include one or more of the following features. The grating pattern is chirped along a propagation direction to provide a line focused beam in a far field. The grating pattern is chirped along the propagation direction and curved across the propagation direction to provide a point focused beam in a far field.

According to examples of the present disclosure, an angle tunable laser source is provided and comprises a wavelength tunable illumination source characterized by an operating wavelength and bandwidth and a wavelength tuning range; a planar waveguide structure composed of at least a first cladding, a core and a second cladding layers, optically coupled to at least a portion of output light of the wavelength tunable illumination source; an emission area with a grating pattern disposed on the planar waveguide structure to couple portion of the output light of the wavelength tunable illumination source out of the planar waveguide structure, wherein a direction of the output light is determined by a operating wavelength of the wavelength tunable illumination source, the period of the grating pattern, and the structure of the planar waveguide.

6

Figure 13:
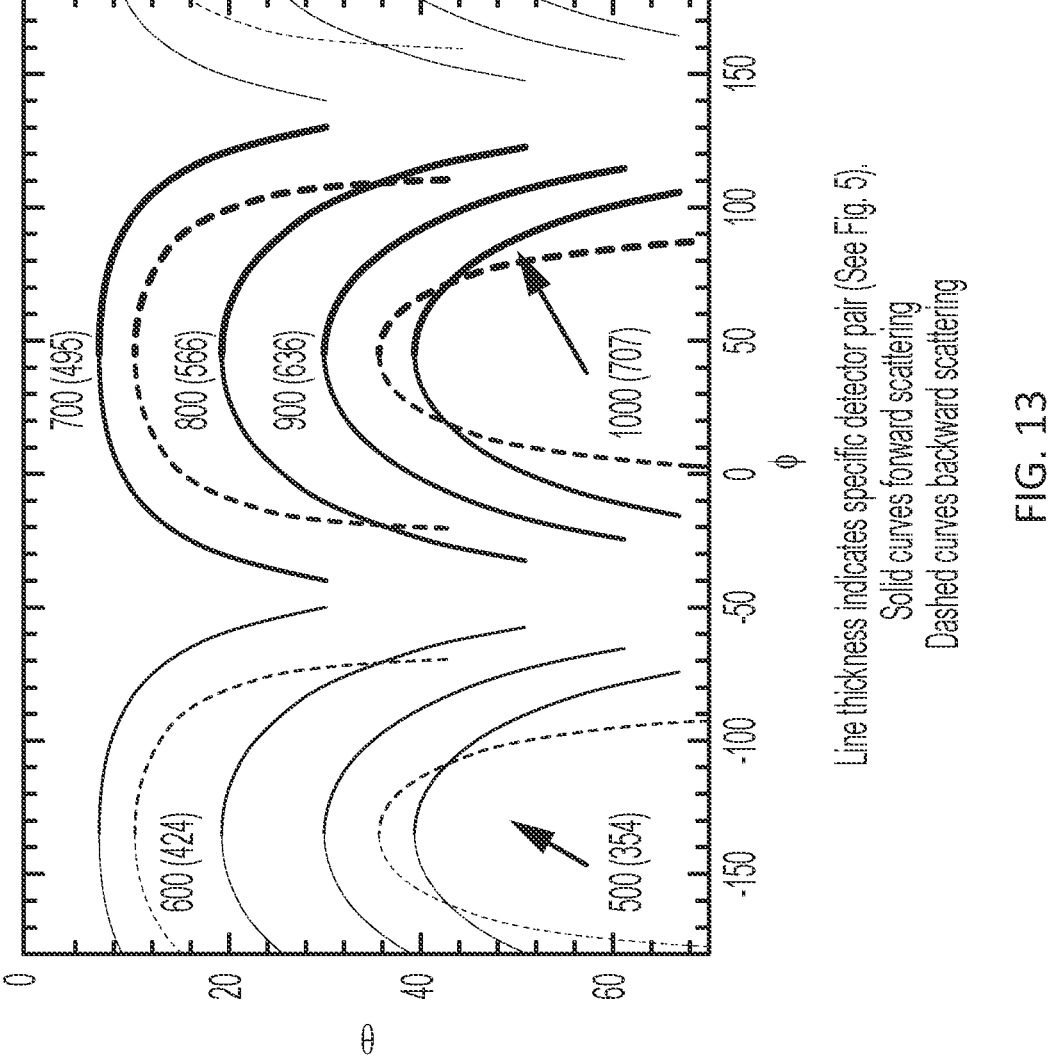

FIG. 13 shows the angular response for the (1,1) and (−1,−1) gratings formed as a result of the 2D grating pattern according to examples of the present disclosure.

Figure 14:
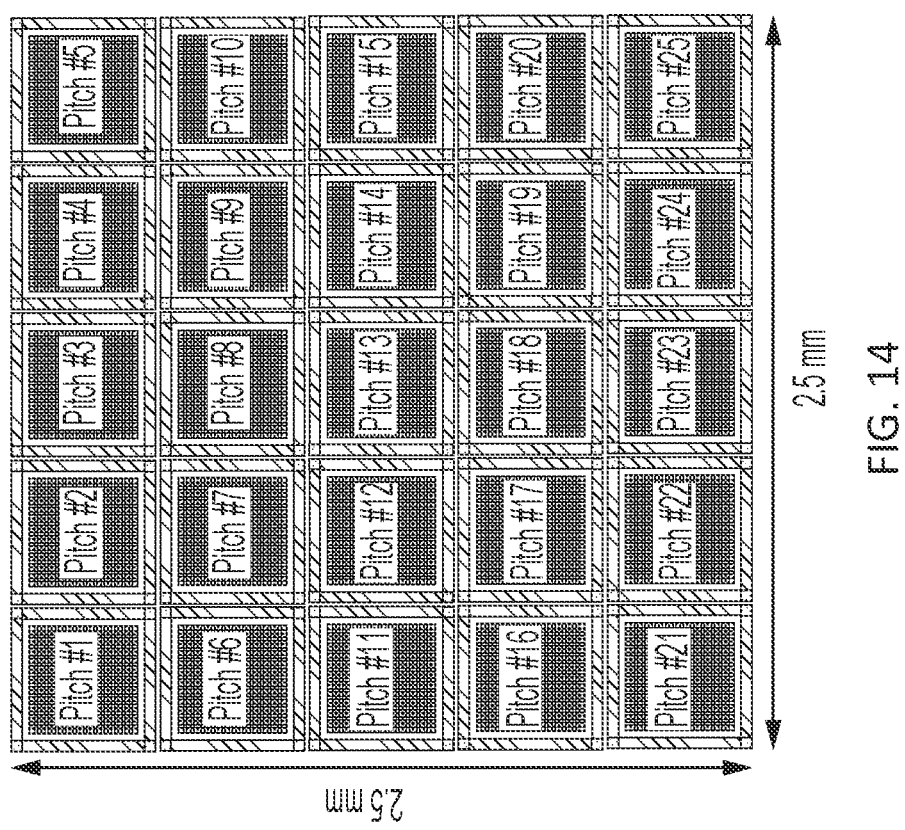

FIG. 14 shows a 5×5 array configuration according to examples of the present disclosure.

Figure 15:
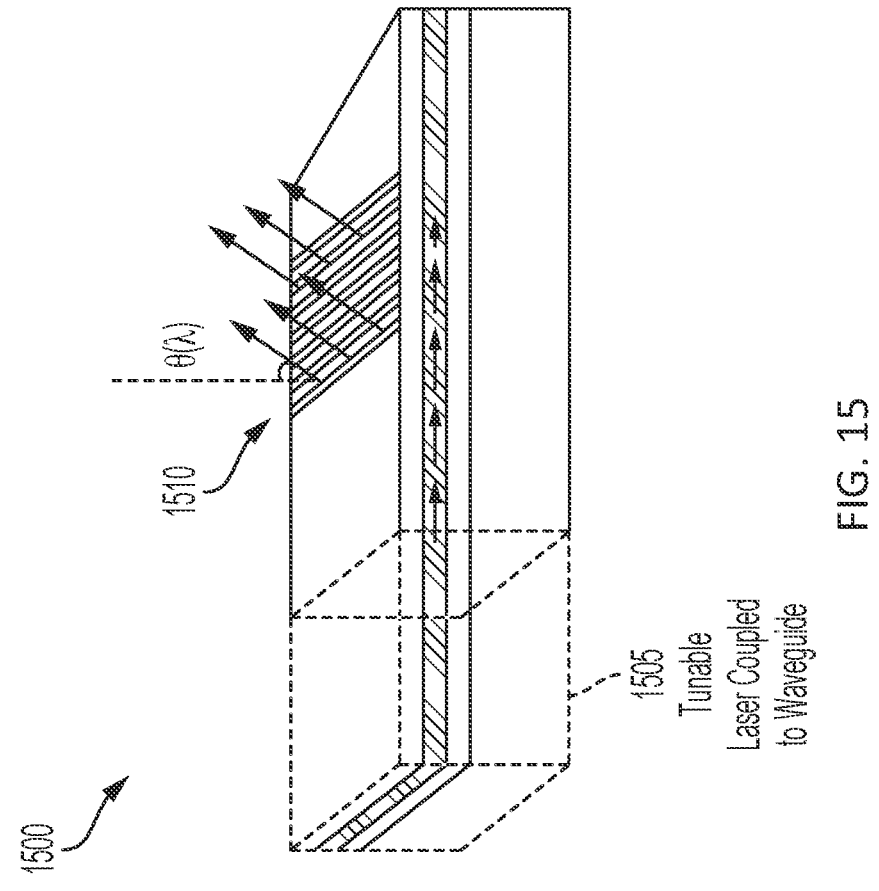

FIG. 15 shows a transmitter application where the direction of the radiation is controlled by the wavelength of the source according to examples of the present disclosure.

Figure 16:
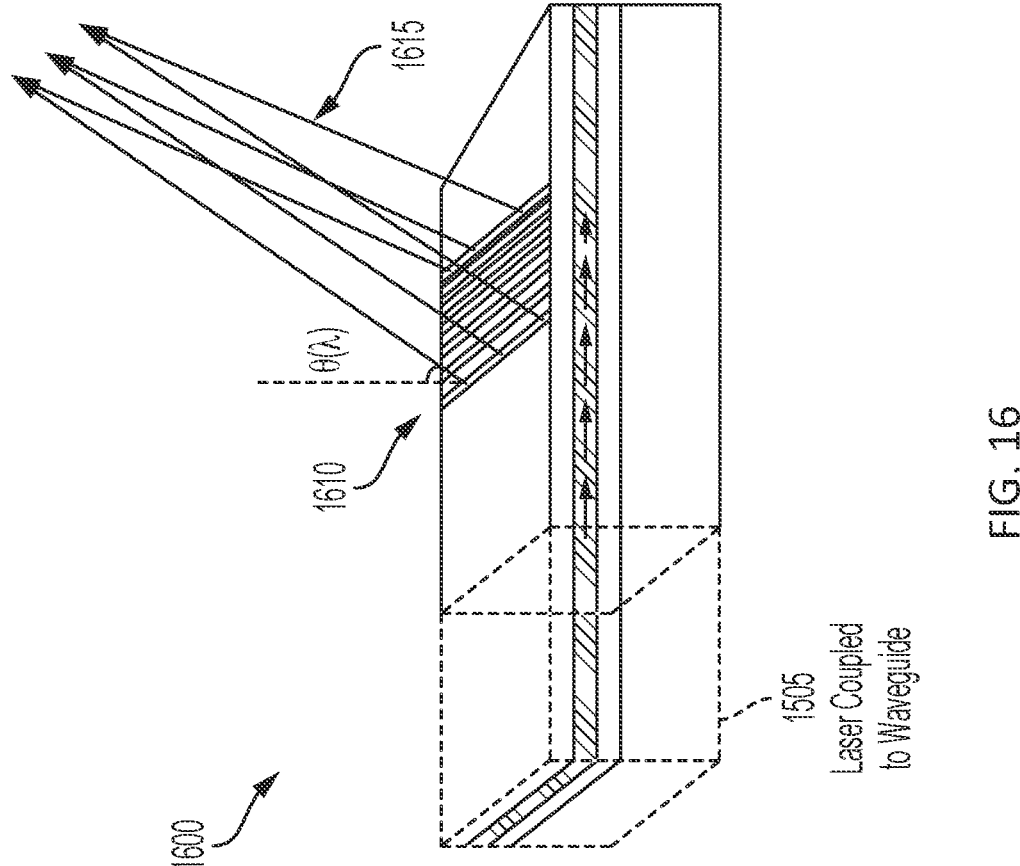

FIG. 16 shows a transmitter application where the grating is chirped to provide a line focus at some distance from the chip according to examples of the present disclosure.

Figure 17:
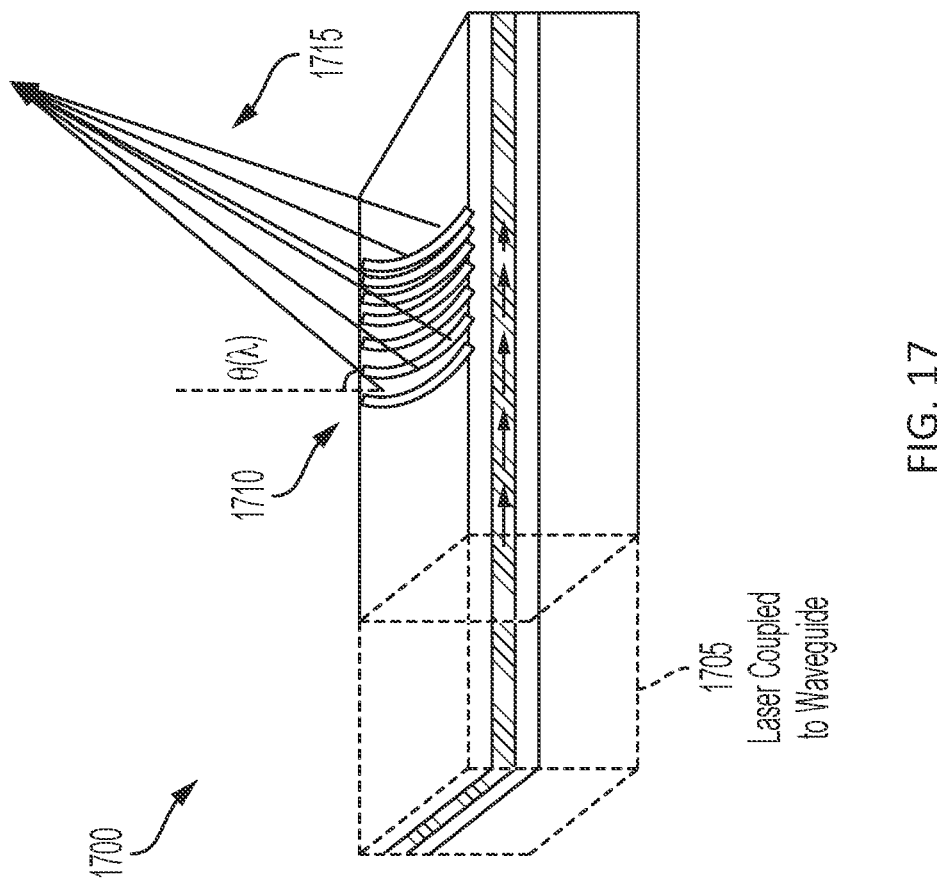

FIG. 17 shows a transmitter application where the grating is both chirped and curved to provide a point focus at some distance from the chip according to examples of the present disclosure.

DESCRIPTION OF THE EMBODIMENTS

Embodiments described herein use grating coupling to bound modes propagating along the surface of a wafer. In one embodiment these bound modes are waveguide modes defined by a dielectric stack (typically low index cladding, high index confinement layer, and low index cladding) atop the wafer. The wafer can be a silicon wafer, in which case the detection element can be integrated onto the wafer for the visible and near-IR spectral regions up to about 800 nm. For longer wavelength radiation a suitable detector material such as Ge or a III-V material such as InGaAs may be used, with additional fabrication steps. Alternatively, a transparent material such as glass may be used as the substrate to allow illumination through the substrate. This is a partially integrated solution that offers some additional degrees of freedom in return for adding assembly steps to the fabrication. Ultimately the manufacturing costs and market size will influence the choice of fully integrated or partially integrated strategies.

Input coupling from free space to the waveguide mode is by a grating coupler arranged to provide the necessary phase matching from free space to guided mode propagation as described by Eq. 1 or its extension for conical diffraction as discussed below. A second grating region is located after the propagation region to couple the energy in the waveguide mode into a semiconductor detector. This detector can be integrated below the waveguide, or the light can be coupled back into free space and detected with a detector mounted on the same side of the waveguide plane as the incident radiation. In either case, the responsive wavelengths of the detector must be matched to the system wavelength.

In another embodiment, the detection element can be fabricated in close proximity (within the range of the evanescent fields in the cladding) so that radiation in the waveguide is directly coupled into the detector without the need of a second grating.

Figure 1B:
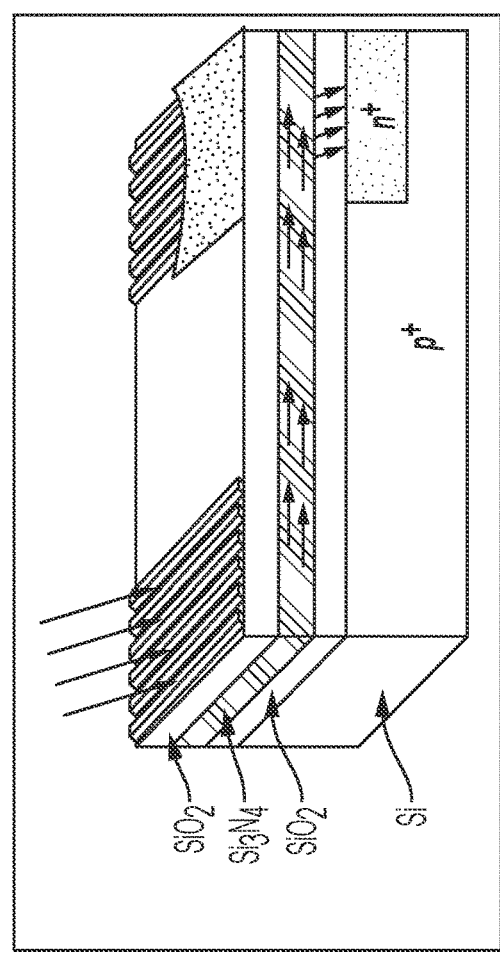
FIG. 1B is another view of FIG. 1A.
Figure 1A:
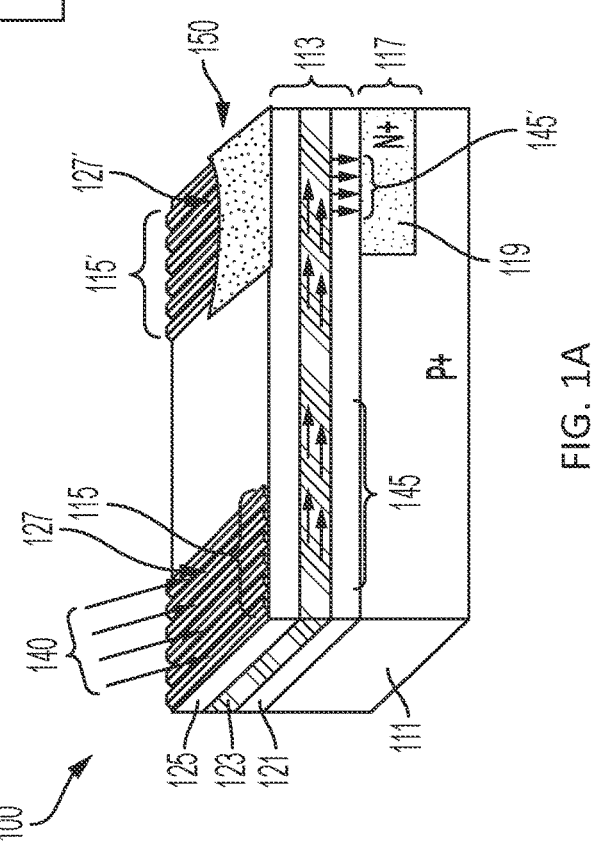
FIG. 1A. (PRIOR ART) is a perspective view of an integrated waveguide angularly sensitive detector element. (this is FIG. 6 of U.S. Pat. No. 9,766,123).

A schematic of the angle resolved detection scheme is shown in FIG. 1A and FIG. 1B.

A plenoptic sensor element 100 in FIG. 1A and FIG. 1B may include a three-layer waveguide structure 113. The waveguide structure 113 may include a first low index cladding layer 121, a high index confinement layer 123, and a second low index cladding layer 125 (e.g., a $SiO_2/Si_3N_4/SiO_2$ waveguide) disposed over a substrate 111, which may be a silicon substrate. The first low index cladding layer 121 and the second low index cladding layer 125 may each comprise $SiO_2$. The high index confinement layer 123 may comprise $Si_3N_4$. The refractive indices of the waveguide layers include are: $SiO_2$–1.5, $Si_3N_4$.about.2.2. The layers of the waveguide structure may be transparent across the visible spectrum. Part of a blocking layer, such as a metal film, used to avoid direct illumination of the detector by the incident light. One of ordinary skill will understand that other material combinations for the waveguide layers are available and are included herein without explicit reference.

The incident light 140 is coupled by a first grating 115 at a specific wavelength and incident angle into a waveguide structure 113 at a coupling region 145, propagates in the waveguide (region without a grating coupler) and is coupled out by a second grating 115' to detector 117. The first grating 115 comprises a plurality of first dielectric grates 127 and the second grating 115' comprises a plurality of second dielectric grates 127'. The light is then out-coupled from the waveguide structure 113 downstream from the coupling region at the second grating 115' (out-coupling grating) located at junction region 145' to detector 117 fabricated in the underlying substrate 111 and comprising at least one p-n junction. The second grating 115' is used to out-couple the light into the detector 117. A cover 150 may be provided over the second grating 115' to shield it from any direct free-space illumination. The detector 117 may comprise an n-doped region 119 of the substrate 111 which may be a p-type substrate or vice versa. Alternatively, localized doping can be used to define the detector region. In place of a simple p-n junction detector, additional elements can be added, as is well known in the art, to construct an avalanche photodector (APD) or a single photon avalanche photodetector (SPAD). These structures offer higher sensitivity in systems applications. The illumination wavelength, the grating period, and the waveguide parameters are chosen so that only light incident from a range of angle around the phase matching condition is coupled into the waveguide. It may be useful to shield the detector from any direct illumination via cover 150. This can be accomplished with a metal film or other shielding element over the photosensitive detector element. For wavelengths where silicon is absorbing (shorter than ~1.2 μm), due consideration should be given to the bottom cladding (Botton OXide or BOX) thickness to minimize propagation losses due to the penetration of the waveguide mode to the silicon. Alternatively, a transparent substrate (such as a glass) can be used to ensure low loss propagation in the waveguide.

Figures 2A, 2B:
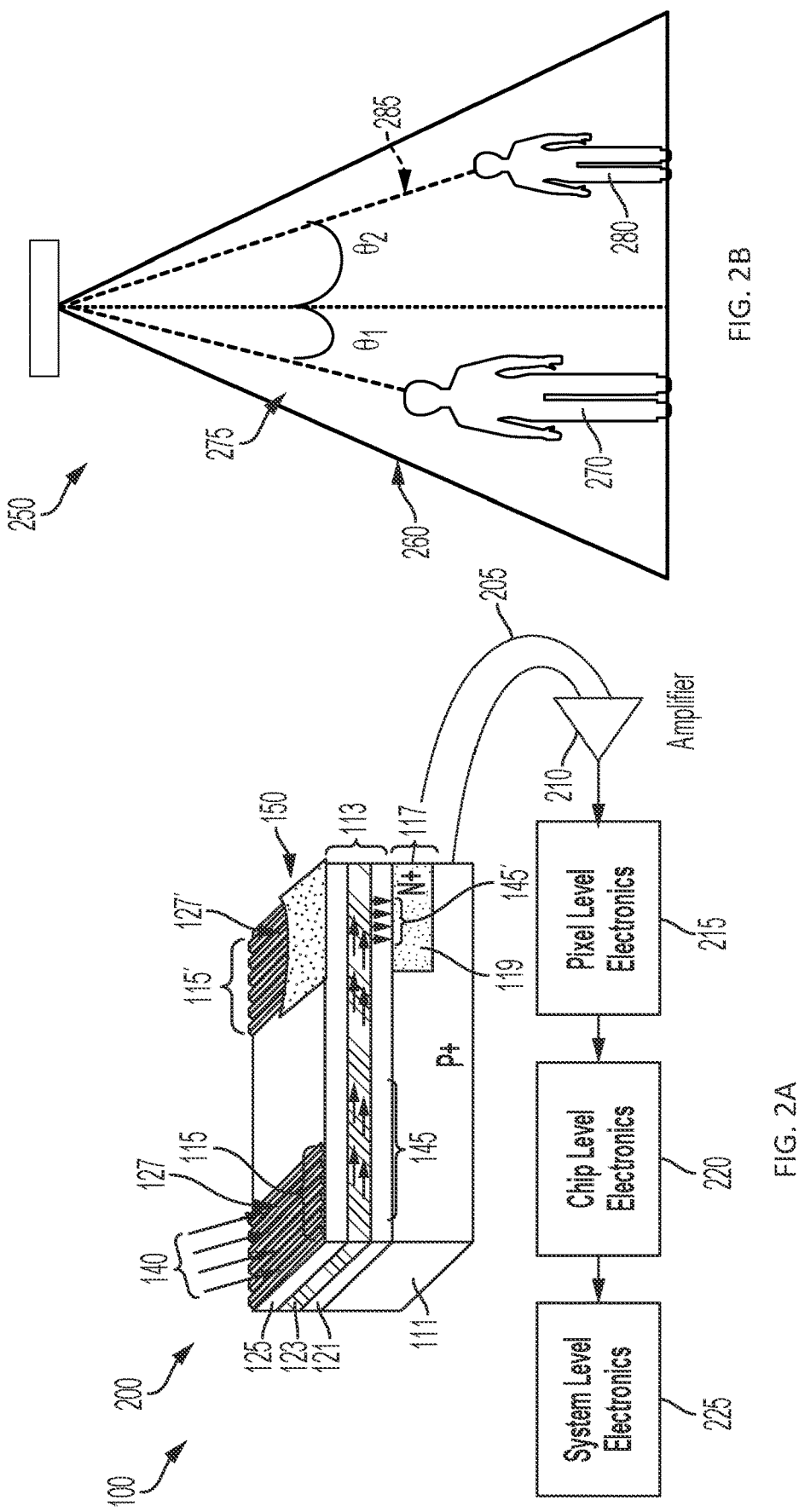
FIG. 2A shows the device of FIG. 1 with electronics consisting of an amplifier, pixel level electronics that is repeated for each pixel in an array; chip level electronics and amasses the data for the array and system level electronics that provides the sensor output for further action.
FIG. 2B shows a schematic for the operation of an angularly sensitive time of flight detector.

FIG. 2A shows a schematic 200 of the electronics associated with the sensor of FIG. 1A, according to examples of the present disclosure. An output of the detector 117 is electronically connected via electrical coupling 2005 to an amplifier 210, which converts the current output of the detector to a voltage output for further processing. The amplifier 210 is electrically coupled to pixel-level electronics 215, which is repeated for each pixel and can include time delay measurement for lidar applications. The pixel-level electronics 215 is electrically coupled to chip level electronics 220, which collects the output from all of the pixels on the chip and system electronics which interprets the sensor output and conditions it for further action. System-level electronics 225 is electrically coupled to chip-level electronics 220. Depending on the implementation, the system level electronics 225 may be on the sensor chip or remote. The remote portion of the electronics may communicate, either by wire or wirelessly, with multiple sensor chips.

The pixel-level electronics 215 and/or chip-level electronics 220 can be configured to measure a time delay between sending out an illumination pulse and detecting a reflection, which is then converted to a distance (related to the speed of light), then additionally may be averaged over a number of returns, and additionally may be compared with results on other pixels to look for coincidences, and then communicated to the system-level electronics 225. The pixel-level electronics 215 and/or chip-level electronics 220 are configured to a start a counter then send out an illumination pulse (not related to the detection) and to stop the counter when a return is detected. The output of the counter is stored when stopped. Additional signal processing may be used to improve accuracy and eliminate false positives.

FIG. 2B shows a schematic of the operation of the angularly sensitive time of flight detection system 250. An illumination pulse covering a wide field of view is emitted from the detection system 250. In the case shown there are two people a taller person 270 and a shorter person 285 that are illuminated by the pulse. Light 275 and 285 is retroreflected from each of these people and is incident on the detection system at angles $\theta_1$ and $\theta_2$ with different elapsed times from the initiation of the pulse as a result of the different round trip distances to each person.

Figure 3:
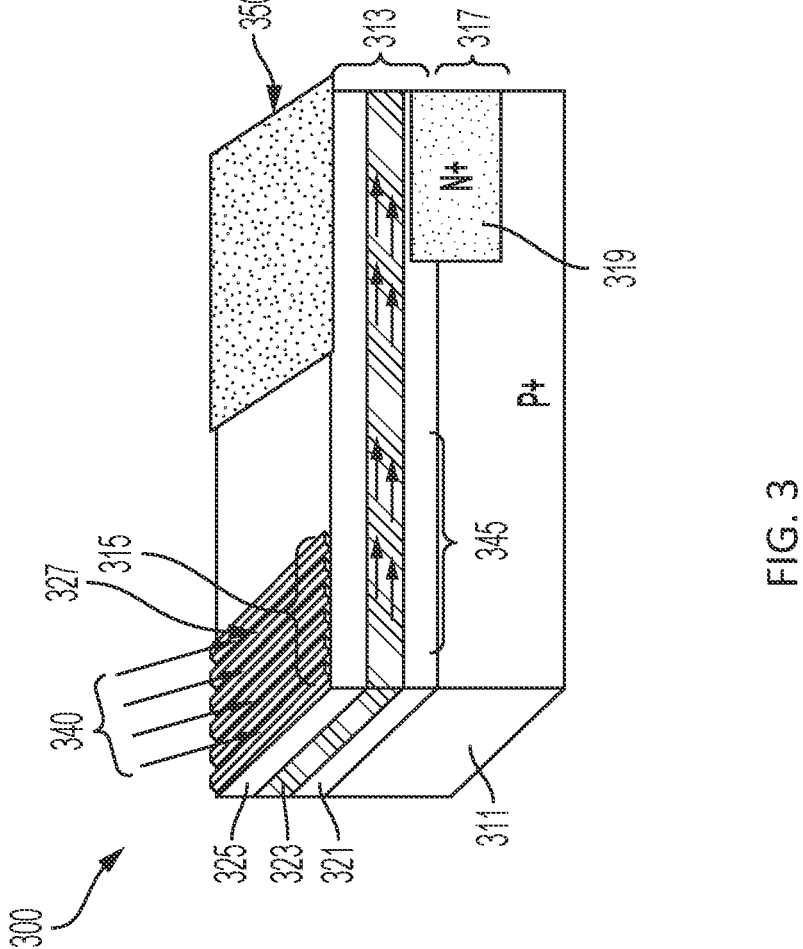
FIG. 3 shows an alternative output coupler based on a raised detector region than intercepts the evanescent fields in the waveguide cladding according to examples of the present disclosure.

FIG. 3 shows an alternative output coupler 300 based on a raised detector region than intercepts the evanescent fields in the waveguide cladding according to examples of the present disclosure. The output coupler (plenoptic sensor element) 300 includes a three-layer waveguide structure 313. The waveguide structure 313 may include a first low index cladding layer 321, a high index confinement layer 323, and a second low index cladding layer 325 (e.g., a $SiO_2/Si_3N_4/SiO_2$ waveguide) disposed over a substrate 311, which may be a silicon substrate. The first low index cladding layer 321 and the second low index cladding layer 325 may each comprise $SiO_2$. The high index confinement layer 323 may comprise $Si_3N_4$. The refractive indices of one possible waveguide layer combination are: $SiO_2$—1.5, $Si_3N_4$~2.2. The layers of the waveguide structure may be transparent across the visible spectrum. Part of a blocking layer, such as a metal film, may be used to avoid direct illumination of the detector by the incident light. One of ordinary skill will understand that other material combinations for the waveguide layers are available and are included herein without explicit reference.

The incident light 340 is coupled by a grating 315 at a specific wavelength and incident angle into a waveguide structure 313 at a coupling region 345, propagates in the waveguide (region without a grating coupler) and is coupled out under cover 350, which is similar to cover 350, to detector 317. The first grating 315 comprises a plurality of first dielectric grates 327. The light is then out-coupled from the waveguide structure 313 downstream from the coupling to detector 317 fabricated in the underlying substrate 311 and comprising at least one p-n junction. The detector 317 may comprise an n-doped region 319 of the substrate 311 which may be a p-type substrate or vice versa. Alternatively, localized doping can be used to define the detector region. In place of a simple p-n junction detector, additional elements can be added, as is well known in the art, to construct an avalanche photodector (APD) or a single photon avalanche photodetector (SPAD). These structures offer higher sensitivity in systems applications. The illumination wavelength, the grating period, and the waveguide parameters are chosen so that only light incident from a range of angle around the phase matching condition is coupled into the waveguide. It may be useful to shield the detector from any direct illumination via cover 350. This can be accomplished with a metal film or other shielding element over the photosensitive detector element. For wavelengths where silicon is absorbing (shorter than ~1.2 μm), due consideration should be given to the bottom cladding (Botton OXide or BOX) thickness to minimize propagation losses due to the penetration of the waveguide mode to the silicon. Alternatively, a transparent substrate (such as a glass) can be used to ensure low loss propagation in the waveguide.

The raised detector configuration of FIG. 3 provides for a variety of advantages including the elimination of the need for an output grating, higher coupling efficiencies since there are fewer output channels than for a grating structure, and being less likely to be susceptible to scattered light coupling to the detector. The positional placement of the raised detector is such that it intercepts some, but not all of the field in the lower cladding. If the raised detector is too far from the core of the waveguide, the absorption length may be too long compared with the extent of the detector, and if the raised detector is too close to the core of the waveguide, the reflection at the start of the semiconductor may be too strong. In one non-limiting example, the raised detector is placed at a position where the field strength has decayed to about 5% of the value in the center of the waveguide.

For the grating outcoupling approach of FIG. 1A, FIG. 1B, FIG. 2A, and FIG. 3, the p-n junction is first defined with an appropriate doping profile. Since the active areas are quite large, one alternative is to use a simple diffusion process to define the junction areas. Alternatively, ion-implantation and annealing can be used as is well known in the art. Following the junction formation, blanket layers of the waveguide—lower cladding, waveguide core, and upper cladding—are deposited by an appropriate deposition technique. Techniques such as sputtering, evaporation and spin coating among others are available and are well-known. One or more lithography and pattern transfer steps are next used to define the in-coupling and out-coupling regions. Additional standard lithography/etch/metal deposition/annealing steps are used to provide the electrical contacts and the cover over the p-n junction to protect it from direct illumination. There is substantial background on silicon detectors among which pin, avalanche photodetectors (APD) and single photon avalance detectors (SPAD) are commonly used. All of these are incorporated herein by reference. The choice will depend on specifics of device design and expected signal levels.

For the outcoupling approach of FIG. 3, based on a raised detector concept, an initial step is to etch a plateau in the substrate (which may be a silicon-on-insulator (SOI) wafer, to define the location of the raised detector, an oxide deposition and planarization is then performed to define the bottom cladding region. Additional steps follow the general plan for FIG. 1A, FIG. 1B, and FIG. 2A.

The parameters of the waveguide are chosen to provide a single (TE, TM) mode pair across the wavelength range of interest allowing the use of different gratings to adjust the individual pixel angular/wavelength coupling resonances.

In a single-mode slab waveguide, the modal index of a $SiO_2/Si_3N_4/SiO_2$ slab waveguide varies across the range of 1.5 (at long wavelengths, e.g. the refractive index of the cladding) to 2.2 (at short wavelengths, e.g. the refractive index of the confinement layer or core). Without the grating, there is no coupling for light incident on this waveguide from the top since the mode phase velocity is always slower than the speed of light in free space. Just as in the SPW case, this momentum deficit can be made up with a grating. Very high coupling efficiencies, approaching 100%, are readily achieved. Since the waveguides are lossless, the resonance line widths are much smaller than in the SPW case. The spectral/angular linewidth is a function of: 1) the width of the grating; 2) the illuminated grating width; and 3) the grating coupling strength (often quantified as a coupling length—the distance over which the energy in the waveguide saturates for a plane wave input as a result of a balance between input coupling and reradiation back into the plane wave. As illustrated below, with an illuminated grating width of 200 μm in the weak coupling limit, a resolution of about 5 nm was achieved with a 200 μm wide coupling area. It is possible to adjust the resonance linewidths by several techniques: 1) chirping (varying the pitch across the collection area) the grating, and 2) including a lossy element, for example but not restricted to silicon nanoparticles in the waveguide to increase the waveguide losses. It will be necessary to design an appropriate engineering compromise between the resonance bandwidth and the propagation lengths between the coupling region and the detection region.

The coupling strength (coupling area, position relative to the waveguide, height, and duty cycle of the grating) should be optimized. Too weak a coupling length reduces energy coupled into the guided mode; too strong a coupling and the guided mode is reradiated into free space. The coupling strength is correlated with the coupling length.

Assuming uniform illumination over an area larger than the collection area, the angular resolution of the pixel is set by the smaller of the linear dimension of the grating perpendicular to the wavevector or the coupling length of the grating/waveguide combination. Too strong a coupling both limits the resolution and results in a weaker signal as energy is coupling out of the waveguide within the collection area. It is necessary to ensure that this resolution is commensurate with the application and that a sufficient signal to noise ratio is achieved for robust sensor operation. As discussed below, systems considerations will impact the array design.

The illumination can be coupled into the waveguide in either the forward or the backward direction. The phase matching conditions are given by alternate signs in Eq. 1, e.g.

$$\text{forward:} \quad \pm\left(\sin\theta_{in} + \frac{\lambda_0}{d_1} = n_{mod\,e}^{TE,TM}(\lambda_0)\right)$$

$$\text{backward:} \quad \pm\left(\sin\theta_{in} - \frac{\lambda_0}{d_2} = -n_{mod\,e}^{TE,TM}(\lambda_0)\right),$$

where the ±signs correspond to plane waves incident from the left and the right, respectively. Note that for a fixed angle of incidence, wavelength, and polarization, the coupling conditions correspond to different grating periods $$\left(d_1^{TE,TM}, d_2^{TE,TM}\right).$$

It may be advantageous to have different grating coupling constants for the two gratings to allow independent optimization of the coupling and detector areas. One embodiment to accomplish this is to fill the detector grating with a material with a larger dielectric contrast, for example a metal, increasing the grating coupling with the same structure, for manufacturing considerations. This could be combined with the masking of the active detector area in a single metal deposition.

As an alternative to the second grating out-coupler, it is possible to structure the sample with a raised detection region so that the near fields of the waveguide mode in the bottom cladding overlap with the semiconductor detector as illustrated in FIG. 2A. The overlap region is adjusted to optimize both the coupling efficiency into the detector and to minimize the reflection in the waveguide.

FIG. 1A, FIG. 1B, FIG. 2A, and FIG. 3 represent a single detection element. An array with different grating periods, and hence different coupling angles is required for a position sensor where the general idea is to track the variation of angular scattering as the objects in front of the sensor rearrange.

Figures 4A, 4B:
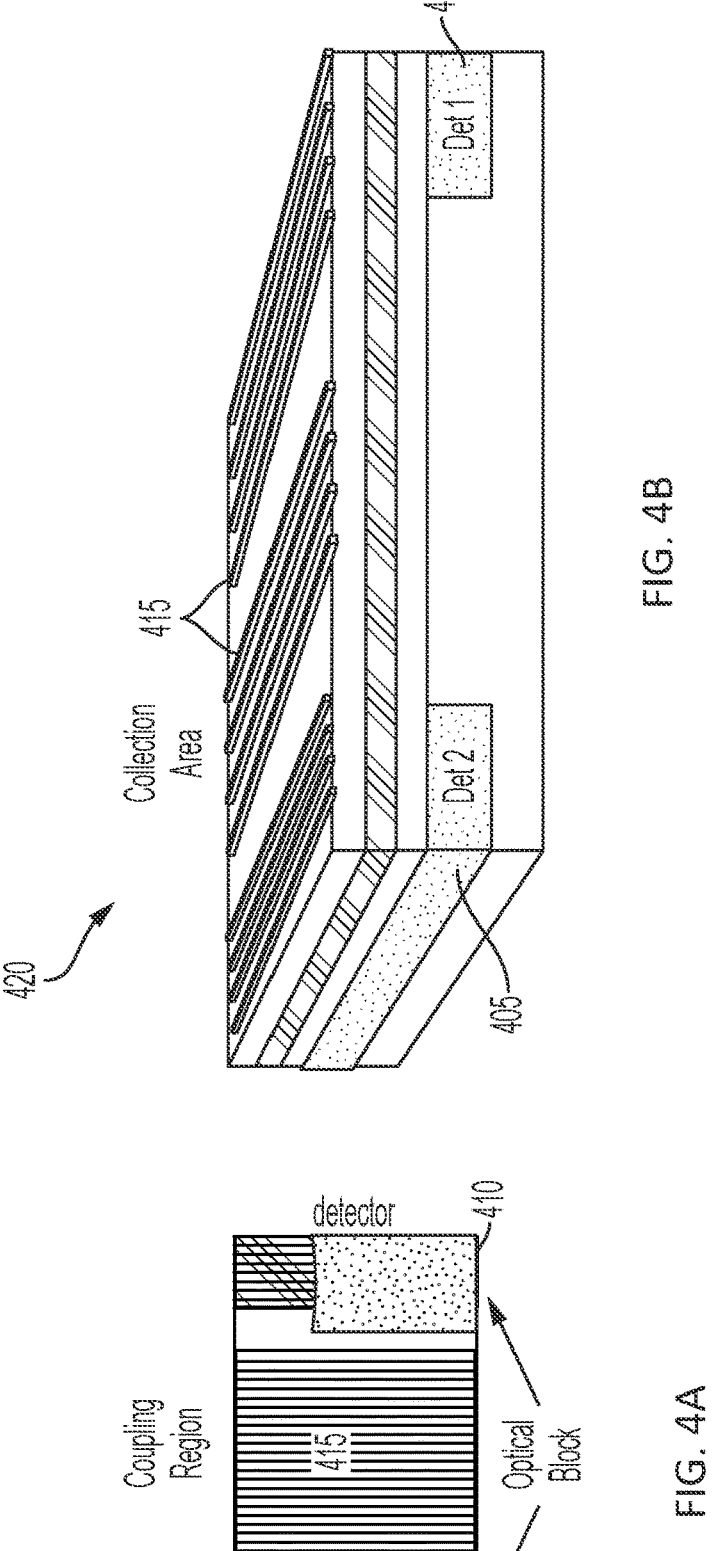
FIGS. 4A and 4B show a top view and a perspective view, respectively, of a collection area with detector elements to both sides of the collection area according to examples of the present disclosure.
Figure 5:
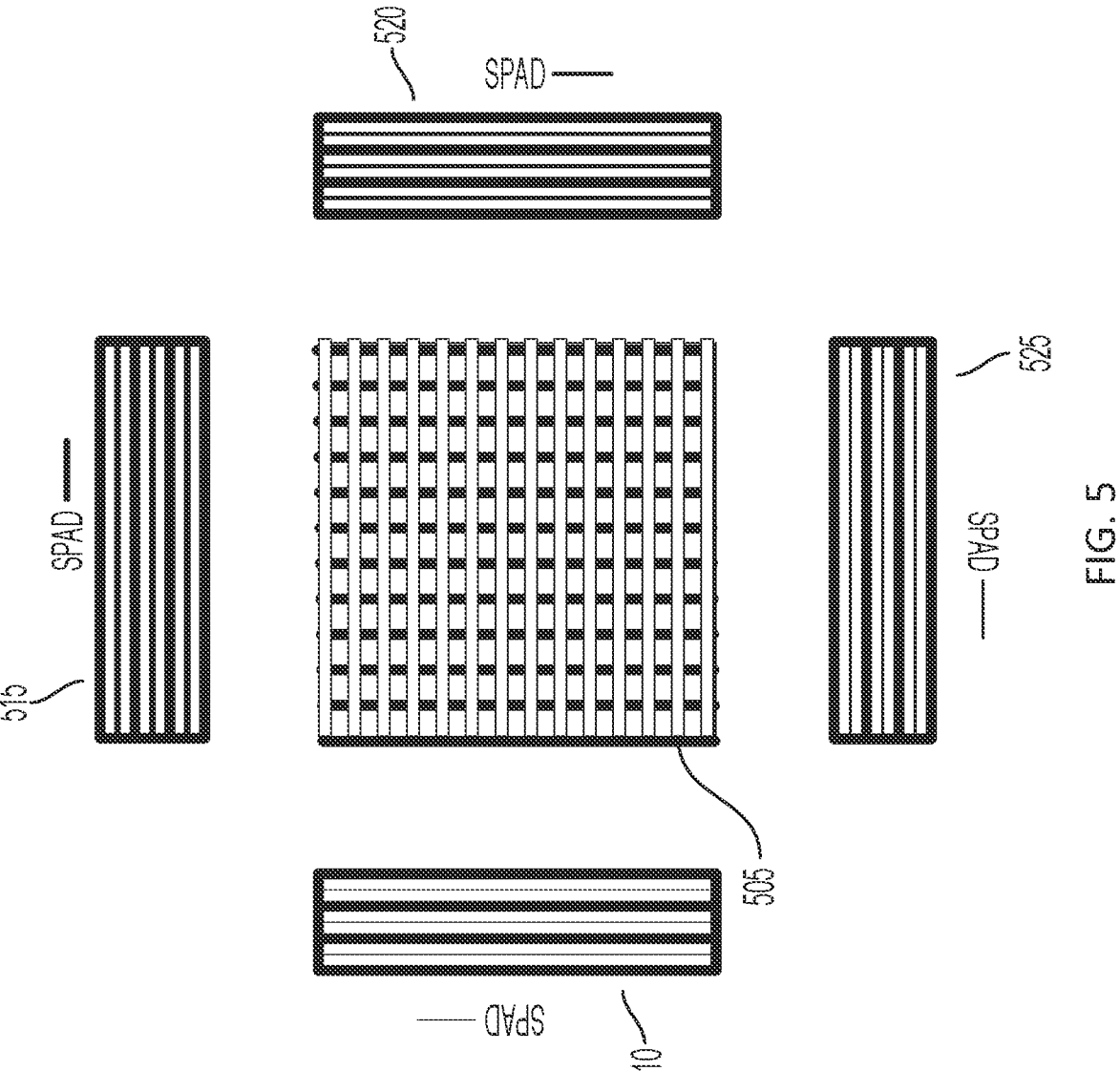
FIG. 5 is a top view of a sensor element with a 2D grating collection area and detectors in the four plane directions according to examples of the present disclosure.
Figure 6:
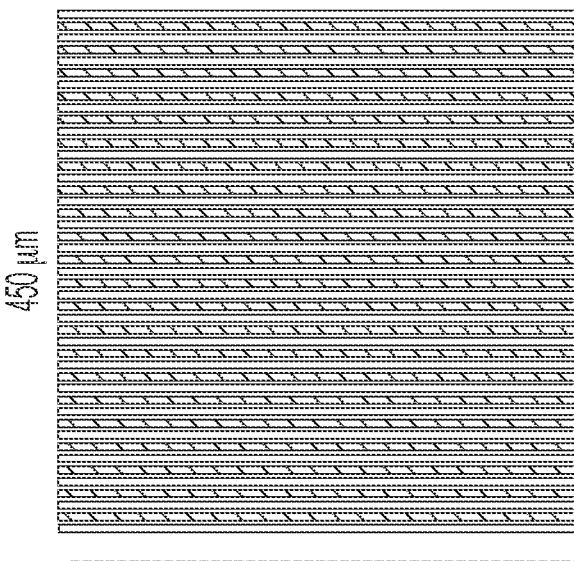
FIG. 6 shows an alternate rectangular collection area geometry according to examples of the present disclosure.

The next step in complexity is to introduce a second detector to the opposite side of the collection area as shown in FIG. 4A and FIG. 4B. FIG. 4A and FIG. 4B show a top view 400 and a perspective view 420, respectively, of a collection area with detector elements 405 and 410 to both sides of the collection area 415 according to examples of the present disclosure. Here illumination from a plane wave incident from the left at a resonance angle ° forward to the collection area is coupled to the detector on the right, and a plane wave at the same angle from the left is coupled to the detector on the left. For backward scattering (at a different, finer period) the roles of the two detectors are reversed. It may be necessary to add absorbing materials in areas beyond the detector regions shown in FIG. 4A and FIG. 4B to suppress reflections that can result in crosstalk between multiple array elements, or in scattered light (flare) that illuminates many pixels without any angular information. In many applications, it is anticipated that pixels such as in FIG. 4A and FIG. 4B will be cascaded with different gratings to provide distinct measurement angles. These pixels will need optical isolation to eliminate cross-talk. One embodiment is to etch through the waveguide layers at the outside of the detectors (the edges of the pixel as drawn in FIG. 4A and FIG. 4B) to eliminate any waveguide propagation between adjacent pixels. An absorber may be introduced in the etched regions to further suppress scattered light from affecting adjacent pixels. Depending on the application, it may be necessary to detect plane wave incident from all angles, conveniently expressed in a spherical coordinate system by the angles θ and φ. Current lithographic tools, necessary for defining the sub-micrometer pitch gratings are optimized for Manhattan (x, y grid) geometries, one approach is to use a square2D grid as the collection area 505 and to place detectors 510, 515, 520, and 525 in all four planar directions as shown in FIG. 5. The linewidths in FIG. 5 correspond to the specific detector. The periods of the x-directed and y-directed gratings can be the same or different, this will be set by the application. For example in the occupancy determination, the resolution requirement is the same in all directions, and similar grating periods are required, but not necessarily on the same pixel. In the autonomous ground vehicle application, the resolution required in the horizontal direction (the direction of the vehicle motion) is much higher than in the vertical dimension, so it may be advantageous to have a finer grid in, for example, the x-direction and a coarser grid in the y-direction. In FIG. 5, the detectors 510, 515, 520, and 525 are labeled as single-photon avalanche detectors (SPAD) which are often used in time-of-flight detection where the time delay between illumination and return pulses is the primary quantity of interest for individual detectors. The detector material is chosen to provide sensitivity at the operational wavelength. Note that while the collection area grating is a 2D grating, the gratings over the detectors can be either 1D or 2D. Both SPAD and avalanche photodetectors (APD) may be used; the choice depends on the application. SPADs are better for time of flight, but provide no information on the magnitude of the reflectivity once a threshold is reached; in contrast APD detectors return information on the magnitude of the reflectivity as well as the time of flight. As drawn, the detection region can be narrower than the collection region. This can be accomplished by arranging for a higher grating diffraction efficiency for the outcoupling as discussed above. Just as in the example in FIG. 3, the outcoupling can be accomplished by the use of raised detector regions without the need for outcoupling gratings.

The angular resolution is inversely related to the coupling length of the grating; the distance over which the amount of light coupled into the waveguide saturates as a result of detailed balance. For longer distances the additional input coupling is saturated as a result of the output coupling from the radiation in the waveguide to free space. A detailed analysis of this has been presented [J. C. Brazas and Lifeng Li, Analysis of input-grating couplers having finite widths, Appl. Opt. 34, 3786 (1995).] The relationship between the coupling length ($L_c$) and the angular resolution is given by:

$$\Delta\theta \sim \lambda/[\pi L_c \cos\theta],$$

where a grating length approximately equal to the coupling length provides the largest power coupling into the waveguide.

The desired $\Delta\theta$ varies with application. For monitoring on indoor spaces (people counting) a resolution of ~5° is typically desired; for an automotive lidar application a finer resolution of ~1° is often required. The $L_c$ for a 5° resolution is only about 4 μm (at a wavelength of 940 nm and an incident angle of 30°). Thus, the collected power saturates as the width of the collection area perpendicular to the grating lines increases beyond Lc (increased area is compensated by a decreased angular width); however the power increases linearly with an increased height of the collection area (in the direction along the grating lines). This implies that a non-square collection geometry provides some advantages. A geometry is shown in FIG. 5 where a rectangular geometry is illustrated with interspersed collection and detection regions; in each instance, the element is much longer in the direction along the gratings than in the orthogonal direction. Multiple regions with the same grating period are connected electrically in parallel to provide an increased signal. This effectively allows larger collection areas for the same Lc and allows independent control of the angular resolution and the total collection area.

The angular resolution also depends on the bandwidth of the illumination source. In most cases, it is desirable to restrict the illumination source bandwidth so as not to substantially impact the angular resolution. The relationship is given by: $\Delta\theta \sim \Delta\lambda/[d \cos\theta]$. In general a linewidth less than ~¼ of the desired angular resolution is considered "narrow band" for the present purposes. Thus, for a 940 nm source with a 700 nm period grating, the allowable bandwidth for a 5° resolution is ~15 nm, which is easily achieved with commercial LEDs and lasers.

Figure 7:
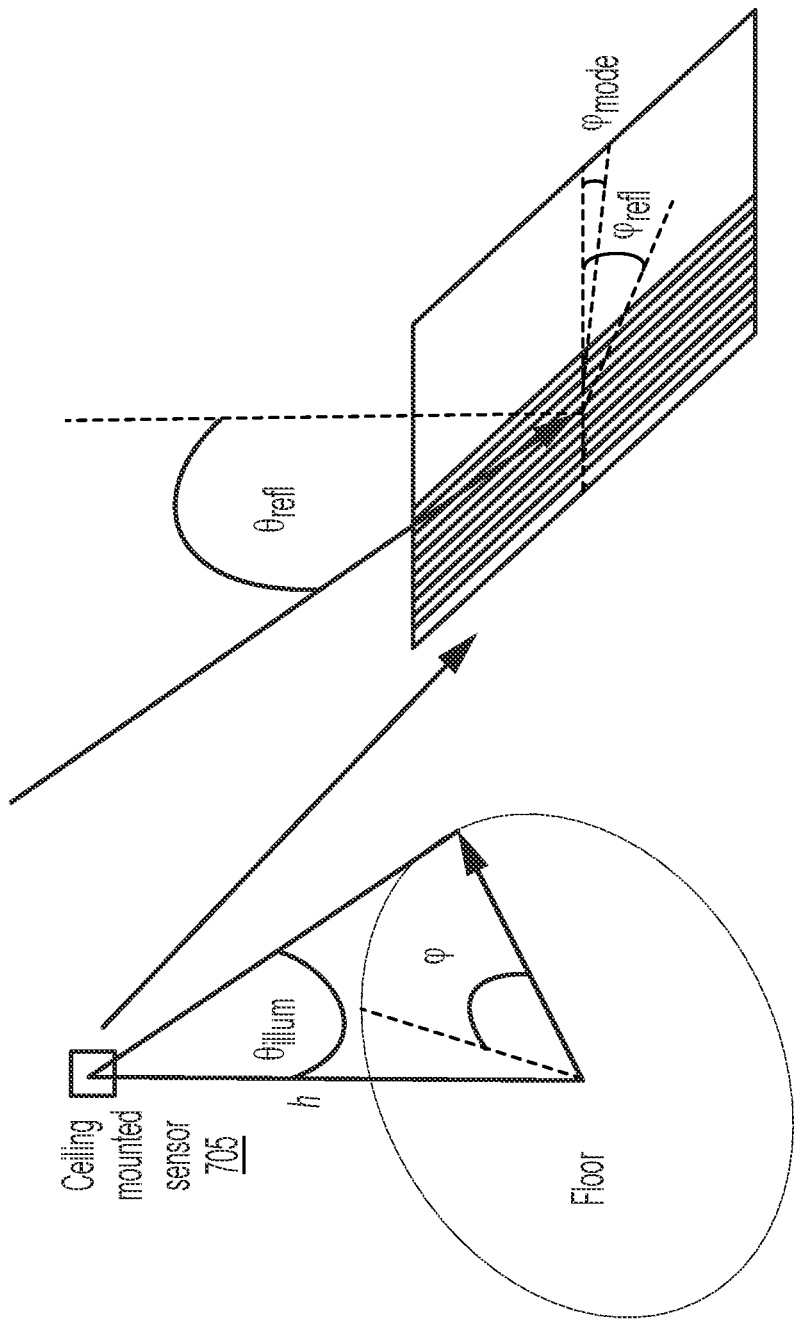
FIG. 7 illustrates the spherical coordinate system used to evaluate the angular response. The grating wavevector (normal to grating lines) is taken at $\phi=0$.
Figures 8A, 8B:
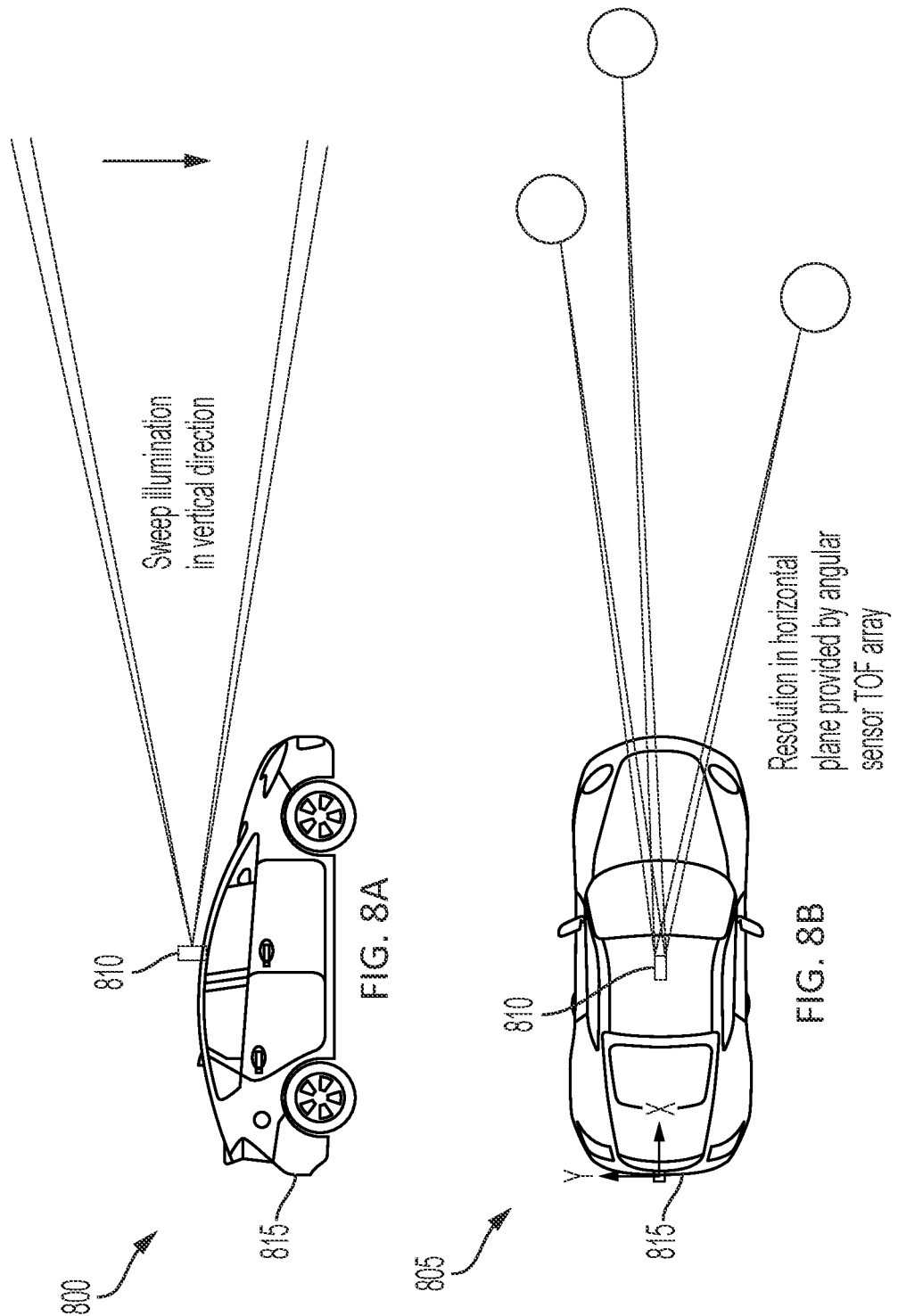
FIG. 8A and FIG. 8B show a side view and a top view, respectively, of a geometry where the illumination is scanned in the vertical direction and a 1D detector array is used to provide the angular resolution in the horizontal direction.

It is important to understand the angular response for a spherical geometry (conical diffraction) where the incident light can come from any (υ, φ) combination. The geometry and resultant wavevector diagram are shown in FIG. 7. The sensor 705 is assumed to be mounted on a ceiling, the illuminator covers a cone with a radius R on the floor; the grating wavevector (normal to the grating lines is aligned along φ=0 as is one of the four detectors. For the lidar application, the sensor 810 is mounted on a moving vehicle 815 (automobile or truck) and much more information is required in the horizontal plane. One alternative is to have a linear array looking at different angles and arrange the illumination to scan the coarse vertical grid. This is illustrated in FIG. 8A and FIG. 8B, where FIG. 8A shows a side view 800 and FIG. 8B shows a top view 805.

Then for an arbitrary angle of incidence, the phase matching condition is written as:

$$k_x(\theta_{refl}, \varphi_{refl}) = \frac{2\pi}{\lambda_0}\left(\sin\theta_{refl}\cos\varphi_{refl} \pm \frac{\lambda_0}{d}\right); \quad (2)$$

$$k_y(\theta_{refl}, \varphi_{refl}) = \frac{2\pi}{\lambda_0}\sin\theta_{refl}\sin\varphi_{refl};$$

$$k_x^2 + k_y^2 = \left[\frac{2\pi}{\lambda_0}n_{mode}^{TE,TM}(\lambda_0)\right]^2$$

For $\varphi=0$, Eq. 2 reduces to Eq. 1 as required.

Figure 9:
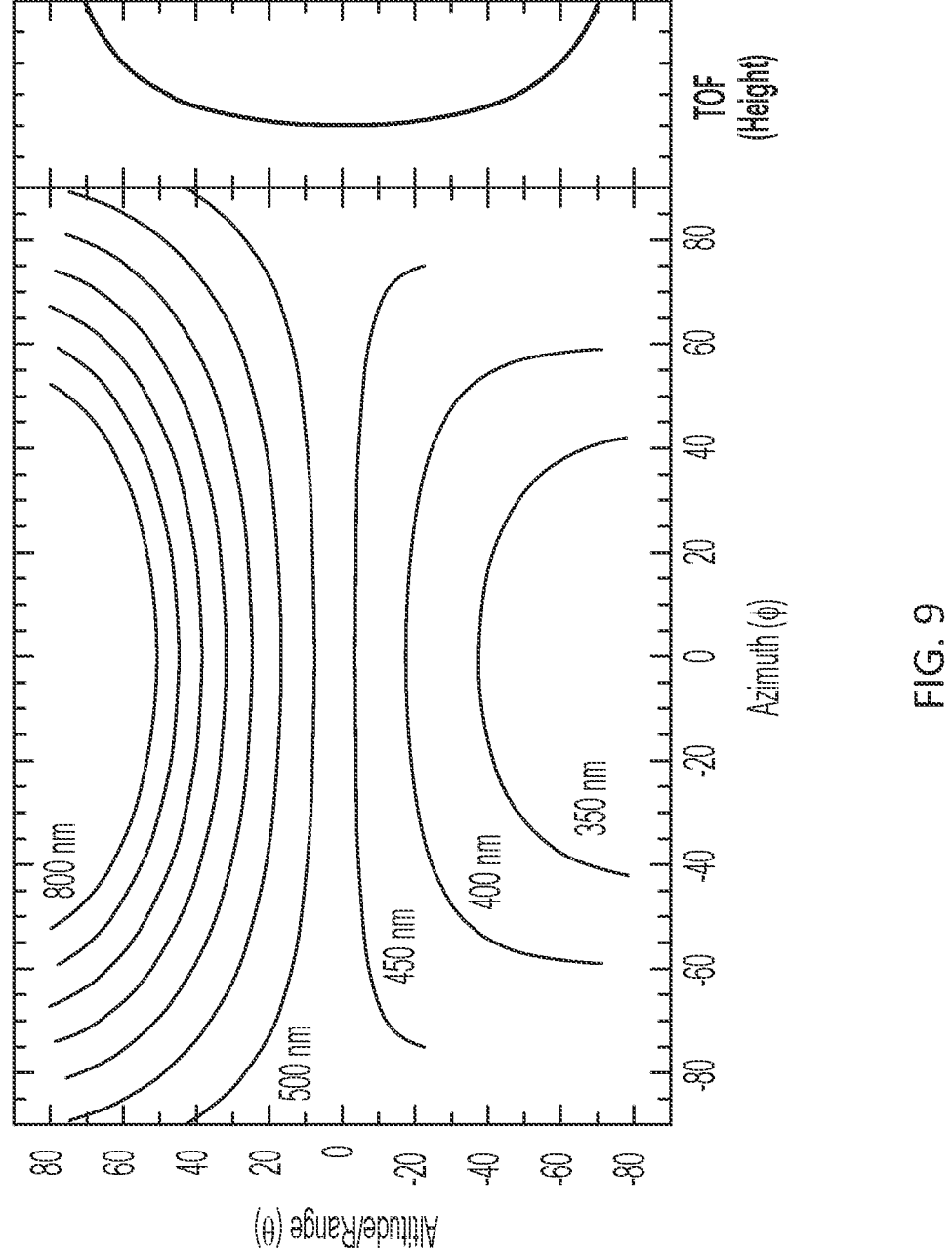
FIG. 9 shows the angular response for a number of grating periods including both forward and backward scattering configurations.

FIG. 9 shows the roots of Eq. 2 for a wavelength of 860 nm; scaling to other wavelengths is straightforward ($\lambda/d$=constant).

Figure 10:
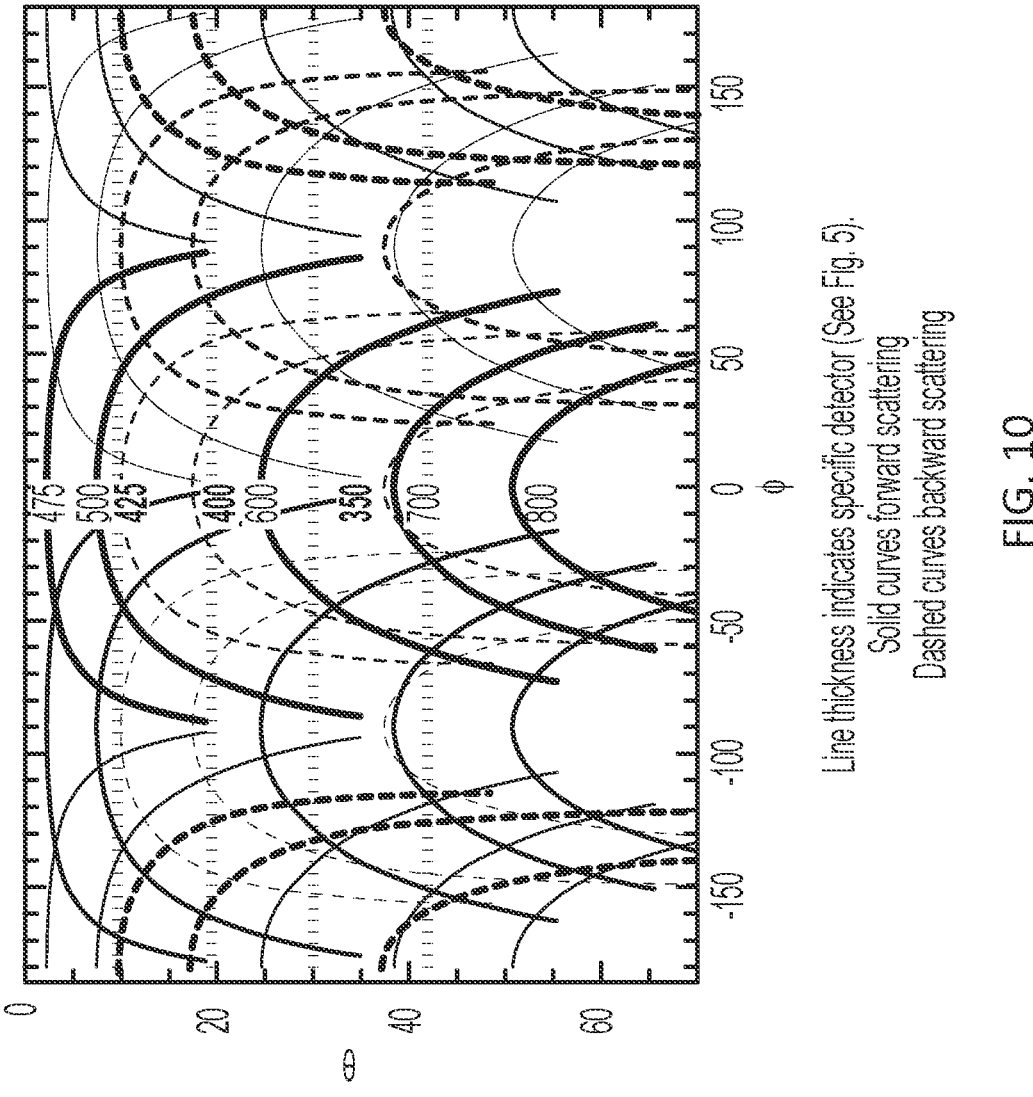
FIG. 10 shows the angular response using a 2D grating pattern in the collection area along with four detectors.

The curves for d=500- to 800-nm in the top half of the figure (labeled forward) correspond to forward scattering, while the finer period curves in the bottom half correspond to backward scattering. The TOF curve on the right-hand side corresponds to the time-of-flight for scattering assuming the sensor is mounted on a 3 m high ceiling and is scattering off of an object that is 2 m above the floor (e.g. a person's head). As indicated on the right panel, the TOF increases for objects off of $\theta=0$ as a result of the longer diagonal propagation and return distances. The sensor returns both angular and TOF information. Using an array of sensors with different grating periods each with four detectors 510, 515, 520, and 525 as shown in FIG. 5, provides detailed information on the objects within the field of view of the illumination system. Additionally, using historical information, it is possible to distinguish between stationary objects (furniture) and moving objects (people). This information can be used for control of HVAC systems, for changes in object position (standing, sitting, fallen) and issuing alerts as necessary. There are four detectors in the configuration shown in FIG. 5, FIG. 7, and FIG. 8. Combining all of the responses yields the results in FIG. 10.

For conical geometries ($\varphi_{refl}\neq0°$, 180°) the waveguide mode propagates at an angle $_{mode}\neq0°$, 180°. As a result, two of the four detectors surrounding the collection area will be illuminated at the same TOF. This can be used to assist in determination of $\varphi_{refl}$. For this application, APD's are necessary to record the relative strength of the signals in the two detectors.

Figure 11:
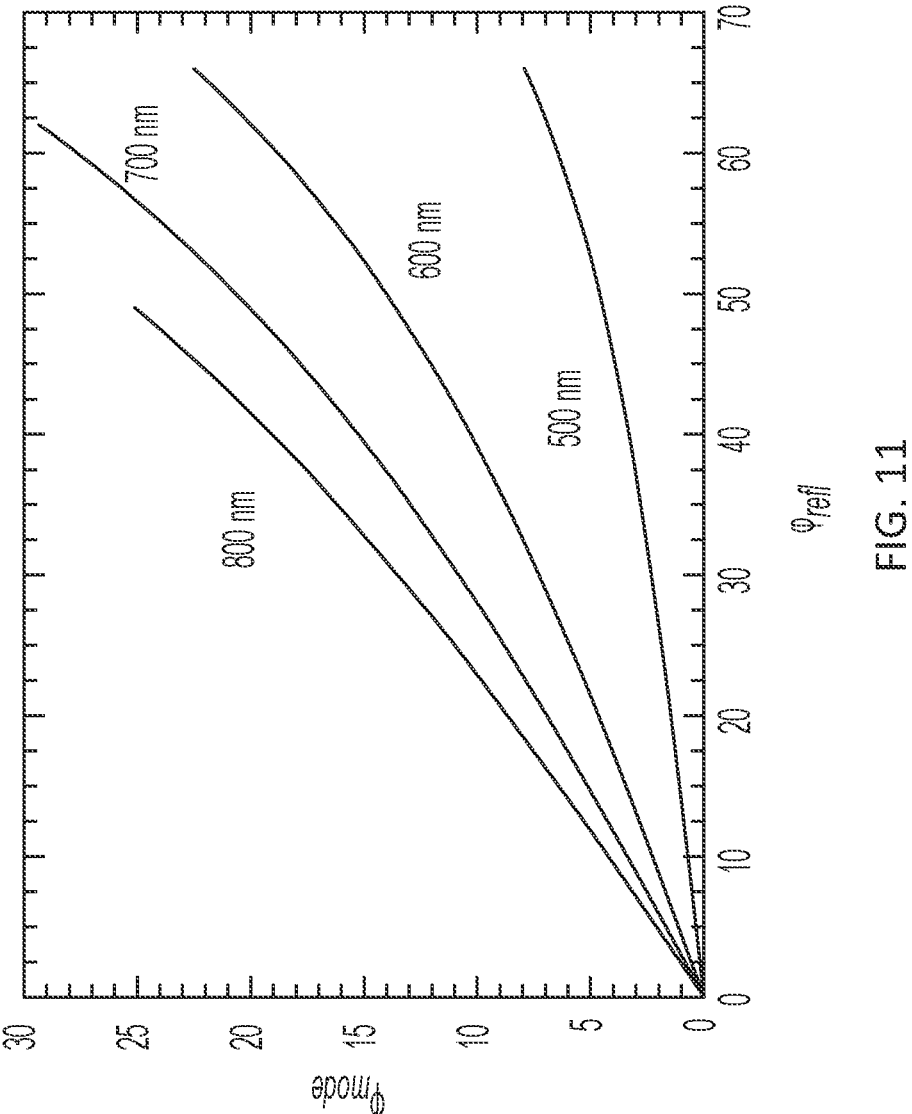
FIG. 11 shows waveguide propagation angles for conical geometries for various grating periods.

FIG. 11 shows the correspondence between the external ($\varphi_{refl}$) and internal (mode) for various grating periods. As a result of refraction upon entering a high index material, the propagation angles are reduced from the incident angle, analogous to the change in propagation direction for light rays entering a high index material.

Figure 12:
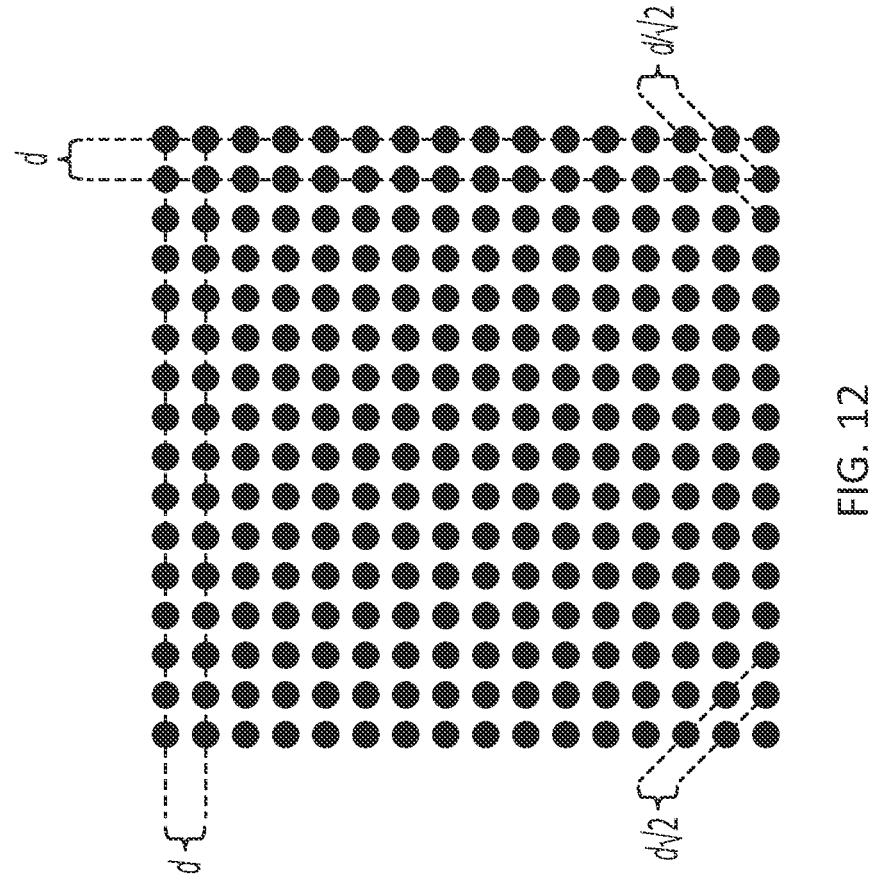
FIG. 12 shows the multiple gratings that are formed with a 2D periodic pattern according to examples of the present disclosure.

A 2D grating structure has additional periodicities as shown in FIG. 12. The periods of these gratings are given as $$d/\sqrt{i^2 + j^2}$$

where (i,j) are indices that refer to the order of the gratings in (x, y) respectively. Thus, (1, 0) is the first order of the grating with a wavevector in the x-direction, (0, 1) is the first order of the grating with a wavevector in the y-direction, (1, 1) is the first order of a grating at 45° to the (x, y) axes, etc. Usually the relative intensities of the coupling drops rapidly for higher orders, only the (1, 0), (0, 1), (±1, ±1) orders are important and higher order gratings usually can be neglected. For the (±1, ±1) orders the wave propagation is at ~45° to the (x,y) axes (varies with conical diffraction as noted above) so that two of the four detectors will be simultaneously illuminated, providing coincidence information that can be used to add confidence to the identification of the angle of incidence.

FIG. 13 shows the angular response for the (1, 1) and (−1, −1) orders. There is of course a complementary set of orders centered at $\phi=-45°$, 135° corresponding to the (1, −1) and (−1, 1) orders. Importantly, these couplings provide additional resolution in $\phi$.

One configuration of the sensor array, a 5×5 array with 25 2D patterned collection areas and 100 detection elements is shown in FIG. 14. Here we have assumed a collection area of 250×250 $\mu m^2$, a detector width of 50 $\mu m$, and a propagation length of 50 $\mu m$, and a pixel separation of 50 $\mu m$. These dimensions of course need to be optimized for specific applications.

In addition to the pixels discussed above, the system requires electrical connections to the detector elements which are routed in the regions between the active pixels, signal conditioning electronics for assigning angular and time-of-flight information to the various combinations of pixels and communications to off-chip electronics for actuation as necessary based on the sensor output. This electronics can be incorporated in the sensor chip (if long wavelength sensors are used they can be either flip-chip bonded to the silicon electronics or grown directly on the silicon material. In another embodiment, the electronics can be on a second silicon chip which is bonded with thru-silicon vias to the sensor chip. The manufacturing details are flexible and will be determined with attention to both cost and volume requirements.

FIG. 15 shows a sensor coupled with a laser source 1500, according to examples of the present disclosure. For a sensor that is coupled with a laser source 1505, such as a DFB laser, each pixel functions as an angle adjustable illumination source as shown in FIG. 14. Equation (1) applies to this situation as well. For a fixed wavelength the output direction is determined by the grating period of grating 1510. Additional focusing could be built into the fabrication of the grating region. FIG. 16 shows one non-limiting example of a sensor coupled with a laser source 1600 comprising a laser source 1605, such as a DFB laser, similar to laser source 1505 and a grating 1610 having a grating pattern that can be chirped to focus output radiation 1615 in one dimension at some distance from the plane of the emission. FIG. 17 shows another non-limiting example of a sensor coupled with a laser source 1700 comprising a laser source 1705, such as a DFB laser, similar to laser source 1505 and a grating 1710 having a grating pattern having lines that are curved to focus output radiation 1715 to a point. As the laser source is tuned, the output sweeps in angle. This could find use in a lidar system either as a 2D sweep, or as a 1D sweep as described above in FIG. 7. The angular sweep will be determined by the wavelength range of the laser source and the period and structure of the grating coupler; the divergence at each angle will be determined by the bandwidth of the laser source and the dimensions and coupling length of the grating coupler.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. An angular sensitive time-of-flight position sensor system device comprising:

a light source that illuminates a field-of-view;

an array of pixels fabricated atop a substrate, each pixel of the array of pixels comprising:

a planar waveguide structure supporting a single transverse electric (TE) mode and a single transverse magnetic (TM) mode;

a collection area with a grating structure pattern to couple light reflected and scattered from objects in the field-of-view that is illuminated into a mode of planar waveguide structure without any intervening imaging optical components;

at least one detector, responsive to the light reflected and scattered from objects in the field-of-view that is illuminated, arranged peripherally to the collection area and vertically displaced from the center line of the planar waveguide structure;

at least one output coupler to direct light propagating in the planar waveguide to the at least one detector;

a cover to shield the at least one detector from direct illumination by the light reflected and scattered from objects in the field-of-view that is illuminated;

a first electronics configured to measure time-of-flight of light reflected and scattered from the objects in the field-of-view that is illuminated; and a second electronics configured to interpret and retain time-of-flight information for each pixel and configured to communicate with external electronics for system applications.

2. The system of claim 1 wherein the at least one output coupler is another grating structure and the at least one detector is incorporated in the plane of the substrate.

3. The system of claim 1 wherein the at least one output coupler is configured by arranging the at least one detector in a region of evanescent fields of a waveguide mode in a cladding of the planar waveguide structure.

4. The system of claim 1 wherein the grating structure pattern is a 2D grating pattern.

5. The system of claim 4 wherein the 2D grating pattern has substantially the same periodicity in two orthogonal directions.

6. The system of claim 4 wherein the 2D grating pattern has different periodicities in two orthogonal directions.

7. The system of claim 1 wherein gratings in the collection area and gratings over at least one detector area have different coupling constants to allow use of a detector area smaller than the collection area.

8. The system of claim 1 further comprising a silicon wafer as the substrate wherein the wafer provides mechanical support for the planar waveguide structure, incorporates the detectors and the electronics that provide the time-of-flight information.

9. The system of claim 1 wherein the planar waveguide structure and the electronics are fabricated on two substrates and bonded together along with thru-silicon-vias for electrical connection.

10. The sensor system of claim 1, wherein a period and an area of each grating structure pattern is chosen to selectively couple light reflected and scattered from the objects in the field-of-view and incident on the collection area from a restricted set of angles.

11. The sensor system of claim 10, wherein the period and area of each collection area grating structure pattern across the array of pixels provide angularly resolved position information on the objects in the field-of-view.

12. The sensor system of claim 1, wherein the light source produces light in narrow spectral band, with a bandwidth less than an acceptance bandwidth of the collection area grating structure pattern.

* * * * *